(12) United States Patent
Ota

(10) Patent No.: US 8,693,884 B2
(45) Date of Patent: Apr. 8, 2014

(54) OPTICAL TRANSMISSION SYSTEM

(75) Inventor: Morihiko Ota, Minato-ku (JP)

(73) Assignee: NEC Corporation, Tokyo (JP)

( * ) Notice: Subject to any disclaimer, the term of this patent is extended or adjusted under 35 U.S.C. 154(b) by 174 days.

(21) Appl. No.: 13/326,095

(22) Filed: Dec. 14, 2011

(65) Prior Publication Data

US 2012/0155856 A1 Jun. 21, 2012

(30) Foreign Application Priority Data

Dec. 15, 2010 (JP) ................. 2010-279769

(51) Int. Cl.
*H04B 10/00* (2013.01)
*H04B 10/50* (2013.01)
(52) U.S. Cl.
CPC .................. *H04B 10/504* (2013.01)
USPC .......................... 398/158; 398/195
(58) Field of Classification Search
USPC ........ 398/9, 43, 66–68, 70–72, 192, 158, 195
See application file for complete search history.

(56) References Cited

U.S. PATENT DOCUMENTS

| | | | | |
|---|---|---|---|---|
| 6,718,513 | B1 * | 4/2004 | Ryu ............................... | 714/799 |
| 2005/0213988 | A1 * | 9/2005 | Noguchi et al. .............. | 398/156 |
| 2010/0040370 | A1 * | 2/2010 | Aoki et al. ...................... | 398/58 |
| 2010/0067905 | A1 * | 3/2010 | Dong et al. ..................... | 398/45 |
| 2011/0076012 | A1 * | 3/2011 | Na et al. .......................... | 398/23 |
| 2012/0148246 | A1 * | 6/2012 | Mukai et al. .................... | 398/58 |

FOREIGN PATENT DOCUMENTS

| | | |
|---|---|---|
| JP | 62-051321 A | 3/1987 |
| JP | 2008-135821 A | 6/2008 |

* cited by examiner

*Primary Examiner* — Dalzid Singh
(74) *Attorney, Agent, or Firm* — Sughrue Mion, PLLC

(57) ABSTRACT

An optical transmission system includes transmitter 100 and receiver 200. Transmitter 100 adds state information for identifying a state of transmitter 100, to a signal and transmits the signal to receiver 200. Receiver 200 obtains the state information added to the signal transmitted from transmitter 100 and identifies a state of transmitter 100 based on the obtained state information.

7 Claims, 3 Drawing Sheets

OPTICAL TRANSMISSION SYSTEM

This application is based upon and claims the benefit of priority from Japanese Patent Application No. 2010-279769 filed in Japan Patent Office on Dec. 15, 2010, the contents of which are hereby incorporated by reference.

TECHNICAL FIELD

The present invention relates to an optical transmission system that performs long-distance transmission.

BACKGROUND ART

In a long-distance transmission system having a transmission speed of 40 G bits/second or more, generally, a modulation system having a low symbol rate is used to improve tolerance to chromatic dispersion or polarization dispersion. For example, it is desirable that a multi-level phase modulation system be used to reduce a symbol rate.

However, in a transmitter and a receiver using the multi-value phase modulation system, there are a lot of locations to be controlled in the transmitter, which thus leads to an increase in the complication of the transmitter and in which performing adjustments (for example, bias control of Lithium Niobate (LN) modulator, etc.) of the transmitter is time consuming, both results being undesirable.

In addition, it is necessary that the adjustment of the transmitter be performed under a condition in which an optical signal is output, so that the optical signal output during the adjustment of the transmitter is input into a receiver at the opposite side of the transmitter through a transmission path. The receiver at the opposite side of the transmitter is not allowed to determine whether the input optical signal is a normal optical signal or an optical signal at the adjustment stage. In addition, the receiver proceeds to a regular operation at a time when transmission of a main signal has been detected. Thus, when the receiver receives an optical signal at the adjustment stage and detects that a main signal has been transmitted, the receiver proceeds to a regular operation, undesirably.

FIG. 1 illustrates an example of the output level of a signal output from a transmitter. Referring to FIG. 1, in the transmitter, the output level of a signal varies dynamically, from the point in time at which the transmitter outputs an optical signal, to an adjustment stage, so that a signal having a stable output level is not allowed to be output. Next, after completion of the state in which the transmitter has been adjusted, a signal whose output is stable is allowed to be output. As illustrated in FIG. 1, fluctuation of an optical level may occur when adjustment of the transmitter is performed. However, the state illustrated in FIG. 1 is a mere example, and transmission waveform may lose shape even when an optical level is constant.

As illustrated in FIG. 1, signal quality in an optical signal at the adjustment stage is worse than signal quality in an optical signal at an adjustment completion stage (regular operation stage), so that communication quality deteriorates and desired communication characteristics are not allowed to be satisfied when the receiver proceeds to a regular operation in a state in which an optical signal at the adjustment stage is received. Thus, the development of a technology is desired in which the state of the transmitter is recognized by a receiver, thereby preventing the receiver from proceeding to a regular operation in a state in which an optical signal at the adjustment stage is received.

In addition, for example, there is JP 62-51321A as a related technology document. In JP 62-51321A, a technology is discussed in which optical input level information monitored by an optical/electric (O/E) conversion circuit of a receiving section is transmitted to an apparatus at the opposite side of the receiver as overhead information, and the optical output level of an electric/optical (E/O) conversion circuit in the transmission section of the apparatus at the opposite side of the receiving section is controlled based on the information.

According to the technology described in JP 62-51321A, the load of a light emitting element is properly adjusted depending on the transmission path distance by controlling the optical output level of the E/O conversion circuit, thereby reducing the load in a case of a short distance. In addition, in the case of a short distance, an undesirable excessive optical input to a light receiving element is allowed to be prevented.

In JP 2008-135821A, another technology is discussed in which comfort noise (CN) characteristics are detected from a received signal at a receiving station, the CN characteristics are transmitted to the transmitting station, an input level to an E/O converter is adjusted at the transmitting station based on the CN characteristics, the input level adjustment information is transmitted to the receiving station, and gain is adjusted at the receiving station side based on the input level adjustment information.

According to the technology described in JP 2008-135821A, transmission and reception are allowed to be performed in an optimal state by performing transmission and receiving various pieces of information between the receiving station and the transmitting station regardless of the state of an optical transmission section.

In JP 62-51321A and JP 2008-135821A, technologies are discussed in which information is transmitted between the transmitter and the receiver, and various control is performed based on the information, however, a technology is not discussed in which the transmitter is allowed to be recognized by the receiver.

SUMMARY

In view of the foregoing observations and description, an exemplary object of the present invention is to provide an optical transmission system that allows a state of a transmitter to be recognized by a receiver, and a controlling method.

In order to achieve the above-described object, the exemplary embodiment of the present invention includes features as follows:

<An Optical Transmission System>

An optical transmission system according to the exemplary embodiment is configured by a transmitter and a receiver, the transmitter includes a transmitting section that adds state information for identifying a state of the transmitter, to a signal and transmits the signal to the receiver, and the receiver includes:
  a receiving section that obtains the state information added to the signal transmitted from the transmitter; and
  an identifying section that identifies a state of the transmitter based on the state information.

<A Controlling Method>

A controlling method performed in a transmitter according to the exemplary embodiment includes:
  performing mapping of state information that identifies a state of the transmitter to an optical transport network (OTN) frame; and
  transmitting the OTN frame to a receiver.

A controlling method performed in a receiver according to the exemplary embodiment includes:

receiving an optical transport network (OTN) frame to which mapping of state information that identifies a state of a transmitter is performed;

obtaining the state information from the received OTN frame; and identifying a state of the transmitter based on the obtained state information.

The above and other objects, features, and advantages of the present invention will become apparent from the following description with reference to the accompanying drawings which illustrate examples of the present invention.

EXEMPLARY EMBODIMENT

<A Summary of an Optical Transmission System According to an Exemplary Embodiment>

Figure 2:
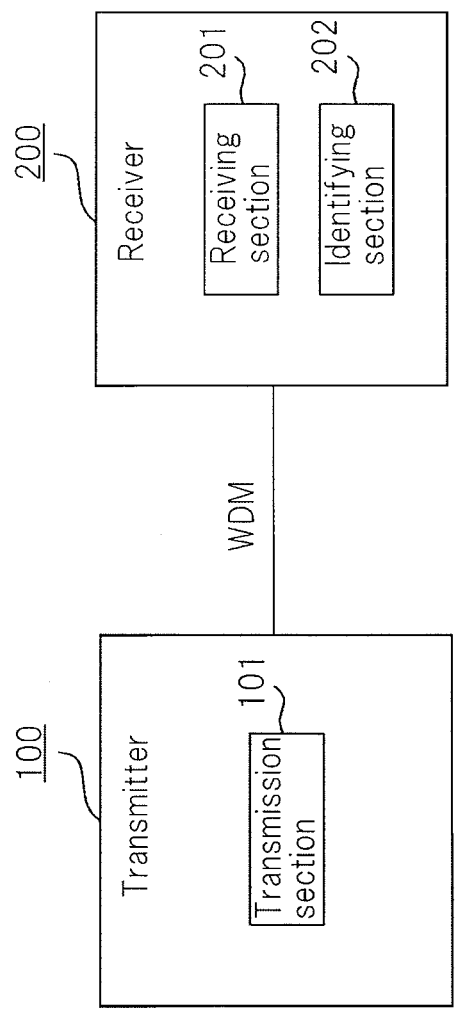
FIG. 2 is a diagram illustrating an outline of an optical transmission system according to an exemplary embodiment.

First, referring to FIG. 2, a summary of an optical transmission system according to an exemplary embodiment is described.

The optical transmission system according to the exemplary embodiment includes transmitter 100 and receiver 200.

Transmitter 100 includes transmission section 101 that adds state information for identifying a state of transmitter 100 to a signal and that transmits the signal to receiver 200.

Receiver 200 includes receiving section 201 that obtains the state information added to the signal transmitted from transmitter 100, and identifying section 202 that identifies a state of transmitter 100 based on the state information obtained in receiving section 201.

In the optical transmission system according to the exemplary embodiment, receiver 200 is allowed to recognize a state of transmitter 100 based on the state information obtained from transmitter 100.

The optical transmission system according to the exemplary embodiment is described in detail below with reference to the accompanying drawings.

<A System Configuration Example of the Optical Transmission System>

Figure 3:
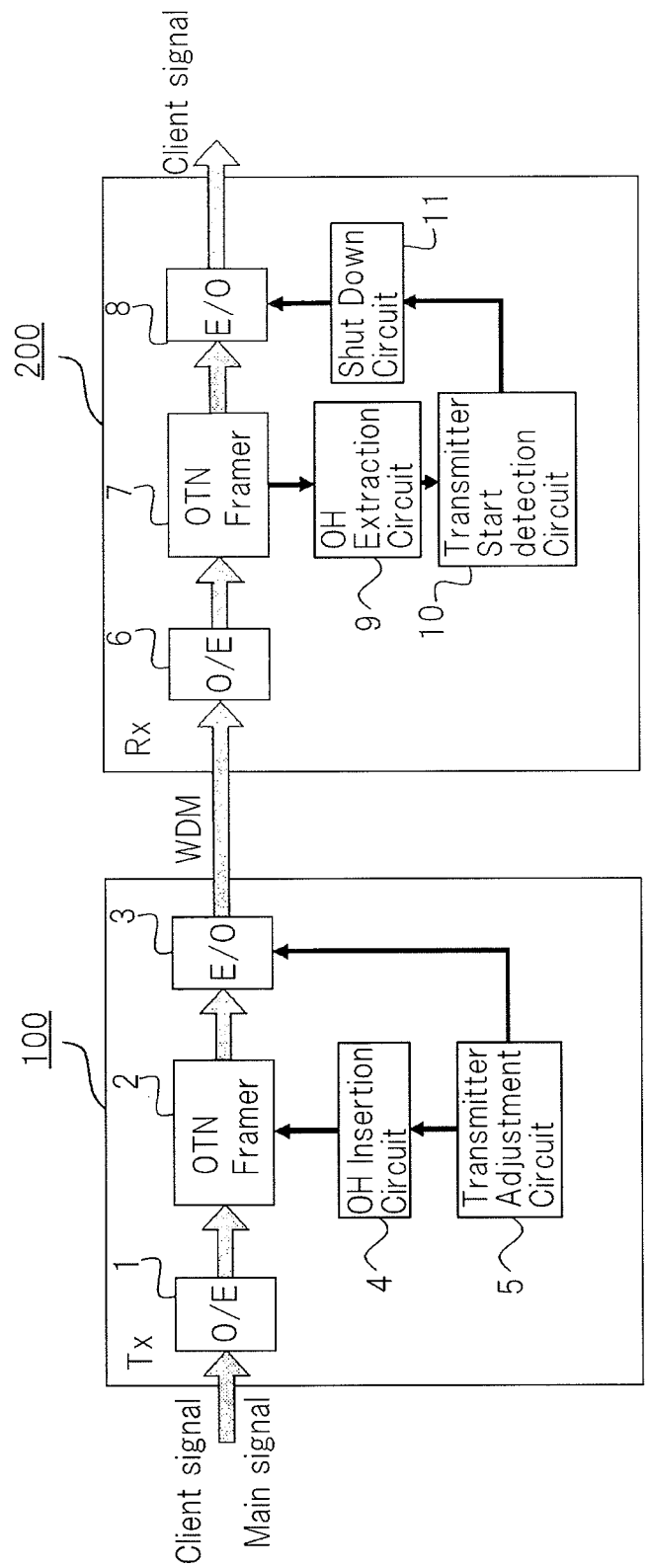
FIG. 3 is a block diagram illustrating a configuration example of the optical transmission system illustrated in FIG. 2.

First, referring to FIGS. 2 and 3, a configuration of the optical transmission system according to the exemplary embodiment is described.

Transmitter 100 includes O/E conversion circuit 1, Optical Transport Network (OTN) framer 2, E/O conversion circuit 3, overhead (OH) insertion circuit 4, and transmitter adjustment circuit 5.

O/E conversion circuit 1 performs O/E conversion of a client optical signal and obtains a client electric signal. O/E conversion circuit 1 supplies the client electric signal to OTN framer 2.

Figure 1:
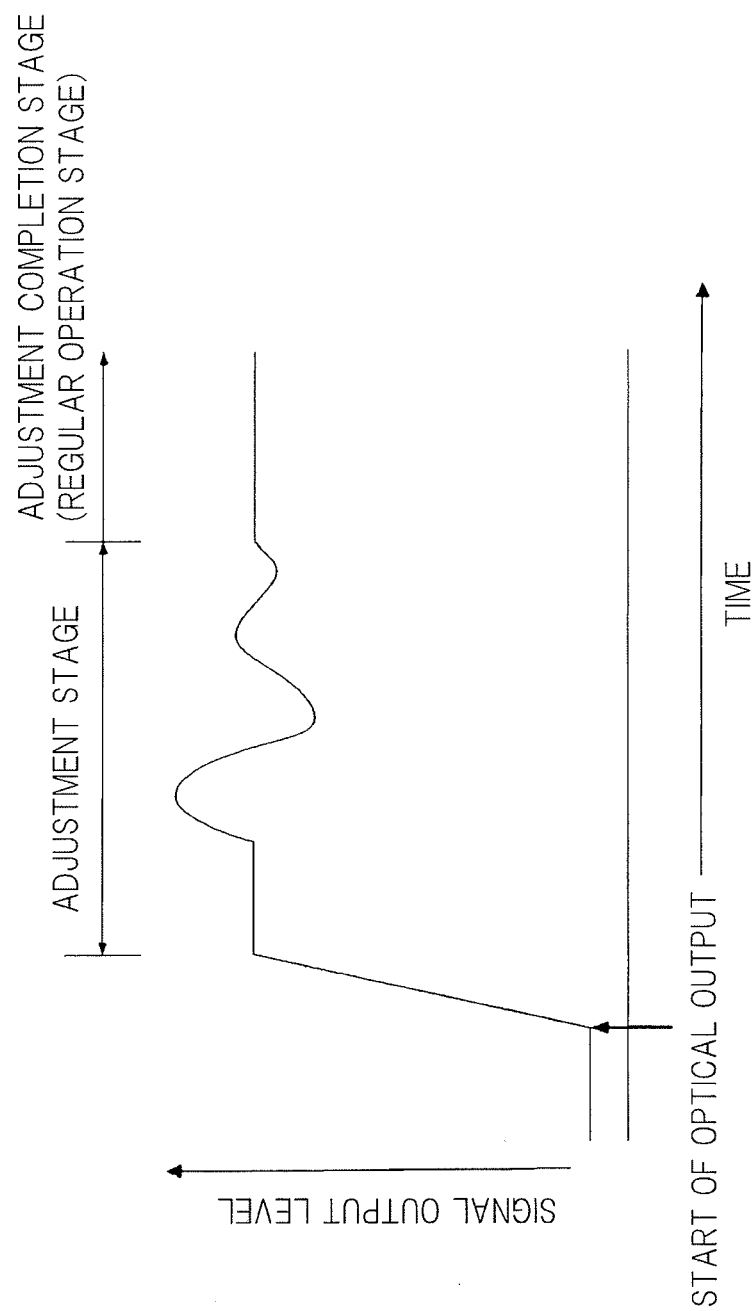
FIG. 1 is a diagram illustrating a problem (status) occurring in an optical transmission system according to an exemplary embodiment.

OTN framer 2 performs mapping of the client electric signal supplied from O/E conversion circuit 1 to an optical transport network (OTN) frame. In addition, OTN framer 2 performs mapping of OH information input from OH insertion circuit 4 to the OTN frame. Adjustment state information for identifying an adjustment state (adjustment stage or adjustment completion stage (regular operation stage)) of transmitter 100 is added to the OH information. The OH information is stored in an OH of the OTN frame. Here, the adjustment stage and the adjustment completion stage (regular operation stage) correspond, for example, to the adjustment stage and the adjustment completion stage illustrated in FIG. 1, respectively.

E/O conversion circuit 3 performs E/O conversion of the OTN frame to which mapping is performed by OTN framer 2, and transmits a wavelength division multiplexing (WDM) optical signal to receiver 200.

Transmitter adjustment circuit 5 performs adjustment (for example, bias control of a LN modulator, etc.) of E/O conversion circuit 3 and outputs the adjustment state information for identifying an adjustment state of transmitter 100, to OH insertion circuit 4.

OH insertion circuit 4 adds the adjustment state information input from transmitter adjustment circuit 5 to the OH information and outputs the OH information to OTN framer 2.

Receiver 200 includes O/E conversion circuit 6, OTN framer 7, E/O conversion circuit 8, OH extraction circuit 9, transmitter state detection circuit 10, and shut down circuit 11.

O/E conversion circuit 6 performs O/E conversion of the WDM optical signal received from transmitter 100 and obtains the OTN frame. O/E conversion circuit 6 supplies the OTN frame to OTN framer 7.

OTN framer 7 performs demapping of the client electric signal from the OTN frame supplied from O/E conversion circuit 6. OTN framer 7 supplies the client electric signal obtained by the demapping to E/O conversion circuit 8.

E/O conversion circuit 8 performs E/O conversion of the client electric signal supplied from OTN framer 7 and outputs a client optical signal.

OH extraction circuit 9 extracts the OH information from the OH of the OTN frame to which the demapping is performed by OTN framer 7, and outputs the adjustment state information for identifying an adjustment state of transmitter 100 from among the extracted OH information, to transmitter state detection circuit 10.

Transmitter state detection circuit 10 identifies a state (adjustment stage or adjustment completion stage (regular operation stage)) of transmitter 100 based on the adjustment state information input from OH extraction circuit 9.

When transmitter 100 is in the adjustment stage, transmitter state detection circuit 10 sends a shutdown instruction to shut down circuit 11. In addition, when transmitter 100 is in an adjustment completion stage and transmission of an optical signal is recognized, transmitter state detection circuit 10 sends a shutdown release instruction to shut down circuit 11.

Shut down circuit 11 shuts down the client optical signal output from E/O conversion circuit 8 based on the shutdown instruction from transmitter state detection circuit 10. Shut down circuit 11 releases the shutdown state of the client optical signal in E/O conversion circuit 8 based on the shut down release instruction from transmitter state detection circuit 10.

<A Processing Operations Example of the Optical Transmission System>

Next, referring to FIG. 3, a processing operations example of the optical transmission system according to the exemplary embodiment is described.

First, a processing operations example of transmitter 100 is described.

Transmitter adjustment circuit 5 performs adjustment (for example, bias adjustment of an LN modulator) of E/O conversion circuit 3.

Transmitter adjustment circuit 5 outputs adjustment state information indicating that transmitter 100 is in the adjustment stage, to OH insertion circuit 4 during the adjustment of E/O conversion circuit 3. OH insertion circuit 4 adds the adjustment state information input from transmitter adjustment circuit 5 to OH information, and outputs the OH information to OTN framer 2.

OTN framer 2 performs mapping of the OH information input from OH insertion circuit 4 to an OTN frame, and stores the adjustment state information in an unallocated area of the OH of the OTN frame. E/O conversion circuit 3 performs E/O conversion of the OTN frame in which the adjustment state information is stored in the OH, and transmits the OTN frame to receiver 200 as a WDM optical signal.

Next, a processing operations example at receiver 200 is described.

Receiver 200 receives the WDM optical signal transmitted from transmitter 100. O/E conversion circuit 6 performs O/E conversion of the WDM optical signal received in receiver 200 and obtains the OTN frame.

OTN framer 7 performs demapping of the client electric signal from the OTN frame output from O/E conversion circuit 6.

OH extraction circuit 9 extracts the OH information from the OH of the OTN frame to which demapping is performed by OTN framer 7 and outputs the adjustment state information for identifying a state of transmitter 100 from among the extracted OH information, to transmitter state detection circuit 10.

Transmitter state detection circuit 10 identifies a state (adjustment stage or adjustment completion stage (regular operation stage)) of transmitter 100 based on the adjustment state information input from OH extraction circuit 9.

When transmitter 100 is in the adjustment stage, transmitter state detection circuit 10 outputs an alarm indicating that transmitter 100 is in the adjustment stage. In addition, transmitter state detection circuit 10 sends a shutdown instruction to shut down circuit 11, and shuts down a client optical signal output from E/O conversion circuit 8.

When transmitter 100 is in an adjustment completion stage and transmission of an optical signal is recognized, transmitter state detection circuit 10 sends a shutdown release instruction to shut down circuit 11. As a result, a client optical signal is output from E/O conversion circuit 8.

<Action and Effect in the Optical Transmission System of the Exemplary Embodiment>

As described above, in the optical transmission system according to the exemplary embodiment, adjustment state information for identifying an adjustment state of transmitter 100 is added to a main signal, and the main signal is transmitted to receiver 200, so that an adjustment state of transmitter 100 is allowed to be identified based on the adjustment state information added to the main signal, at receiver 200.

In addition, receiver 200 reports that transmitter 100 is in the adjustment stage when it is identified that transmitter 100 is in the adjustment stage based on the adjustment state information, thereby preventing receiver 200 from proceeding to a regular operation. As a result, communication quality is allowed to be desirably maintained because receiver 200 does not proceed to the regular operation even when receiver 200 receives an optical signal of the adjustment stage having low signal quality.

In addition, receiver 200 is allowed to shut down an output of the client optical signal when it is identified that transmitter 100 is in the adjustment stage.

As well, the exemplary embodiment mentioned above is only an exemplary embodiment. The scope of the present invention is not limited to only the above-mentioned exemplary embodiment, and the above-mentioned exemplary embodiment is allowed to be modified in various ways within the scope without deviating from the spirit of the present invention.

For example, the method for performing mapping and demapping to the above-described OTN frame is not especially limited, and various methods for performing mapping and demapping are allowed to be applied.

In addition, adjustment state information for identifying an adjustment state at transmitter 100 is allowed to be created in any format as long as receiver 200 can identify an adjustment state of transmitter 100.

In addition, the above-described control operations in transmitter 100 and receiver 200 are allowed to be performed using hardware, software or a combined configuration of the software and the hardware.

When a process is performed using software, a program, which records sequence of the processes, is allowed to be installed in a memory of a computer mounted on dedicated hardware and allowed to be executed. In addition, a program is also allowed to be installed and executed in a general-purpose computer in which various processes are executable.

For example, a program is allowed to be recorded in advance in a hard disk or a read-only memory (ROM) as a recording media. In addition, a program is also allowed to be stored (recorded) in a removable recording media temporarily or permanently. Such a removable recording media is allowed to be provided as a so-called software package. In addition, as a removable recording media, a floppy (registered trademark) disk, a compact disc read only memory (CD-ROM), a magneto optical (MO) disc, a digital versatile disc (DVD), a Blu-ray disc, a magnetic disc, a semiconductor memory or the like are exemplified.

A program may be installed in a computer from the removable recording media mentioned above. In addition, from a download site, the program may be transmitted to a computer using wireless transmission. In addition, the program may be transmitted to a computer via a network using wired transmission.

In addition, in the optical transmission system according to the exemplary embodiment, the operation is allowed to be performed time-sequentially based on the processing operations described in the exemplary embodiment mentioned above, and allowed to be performed in parallel or separately based on the processing capability of an apparatus which performs the operations or as appropriate.

The whole or part of the exemplary embodiments disclosed above can be described as, but not limited to, the following supplementary notes.

(Supplementary note 1) An optical transmission system comprising:
 a transmitter; and
 a receiver, wherein
 the transmitter includes a transmitting section that: adds state information that identifies a state of the transmitter to a signal; and transmits the signal to the receiver, and
 the receiver includes:
  a receiving section that obtains the state information from the signal transmitted from the transmitter; and an identifying section that identifies the state of the transmitter based on the state information obtained by the receiving section.

(Supplementary note 2) The optical transmission system according to Supplementary note 1, wherein
the receiver reports that the state of the transmitter is in an adjustment stage when the state of the transmitter identified by the identifying section is in the adjustment stage.

(Supplementary note 3) The optical transmission system according to Supplementary note 1 or 2, wherein
the receiver shuts down the signal received from the transmitter when the state of the transmitter identified by the identifying section is in the adjustment stage.

(Supplementary note 4) The optical transmission system according to Supplementary note 3, wherein
the receiver releases the shutdown of the signal when the state of the transmitter identified by the identifying section is in an adjustment completion stage.

(Supplementary note 5) The optical transmission system according to any one of Supplementary notes 1 to 4, wherein
the transmitting section performs mapping of the state information to an optical transport network (OTN) frame and transmits the OTN frame to the receiver, and
the receiving section obtains the state information from the OTN frame.

(Supplementary note 6) The optical transmission system according to Supplementary note 5, wherein
the transmitter includes an adjustment section that performs adjustment of the transmitter, and
the transmitting section performs mapping of a state, in which the transmitter is adjusted by the adjustment section, to the OTN frame as the state information.

(Supplementary note 7) A transmitter comprising a transmitting section that: performs mapping of state information that identifies a state of the transmitter to an optical transport network (OTN) frame; and transmits the OTN frame to a receiver.

(Supplementary note 8) The transmitter according to Supplementary note 7, further comprising an adjustment section that performs adjustment of the transmitter, wherein
the transmitting section performs mapping of a state, in which the transmitter is adjusted by the adjustment section, to the OTN frame as the state information.

(Supplementary note 9) A receiver comprising:
a receiving section that receives an optical transport network (OTN) frame, to which mapping of state information that identifies a state of a transmitter is performed, and that obtains the state information from the received OTN frame; and
an identifying section that identifies a state of the transmitter based on the state information obtained by the receiving section.

(Supplementary note 10) The receiver according to Supplementary note 9, further comprising a shut down section that shuts down a signal received from the transmitter when the state of the transmitter identified by the identifying section is in an adjustment stage.

(Supplementary note 11) A controlling method performed in a transmitter, the controlling method comprising:
performing mapping of state information that identifies a state of the transmitter to an optical transport network (OTN) frame; and
transmitting the OTN frame to a receiver.

(Supplementary note 12) The controlling method according to Supplementary note 11, further comprising:
performing adjustment of the transmitter, and
performing mapping of a state, in which the transmitter is adjusted, to the OTN frame as the state information.

(Supplementary note 13) A controlling method performed in a receiver, the controlling method comprising:
receiving an optical transport network (OTN) frame to which mapping of state information that identifies a state of a transmitter is performed;
obtaining the state information from the received OTN frame; and
identifying the state of the transmitter based on the state information.

(Supplementary note 14) The controlling method according to Supplementary note 13, further comprising shutting down a signal received from the transmitter when the state of the transmitter is in an adjustment stage.

(Supplementary note 15) A computer-readable recording medium configured to store a program, the program causing a computer in a transmitter to execute:
performing mapping of state information that identifies a state of the transmitter to an optical transport network (OTN) frame; and
transmitting the OTN frame to a receiver.

(Supplementary note 16) The computer-readable recording medium according to Supplementary note 15, wherein the program causes the computer to further execute:
performing adjustment of the transmitter, and
performing mapping of a state, in which the transmitter is adjusted, to the OTN frame as the state information.

(Supplementary note 17) A computer-readable recording medium configured to store a program, the program causing a computer in a receiver to execute:
receiving an optical transport network (OTN) frame to which mapping of state information that identifies a state of a transmitter is performed;
obtaining the state information from the received OTN frame; and
identifying the state of the transmitter based on the state information.

(Supplementary note 18) The computer-readable recording medium according to Supplementary note 17, wherein the program causes the computer to further execute shutting down a signal received from the transmitter when the state of the transmitter is in an adjustment stage.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

What is claimed is:
1. An optical transmission system comprising:
a transmitter; and
a receiver, wherein
said transmitter includes:
an adjustment section that performs adjustment of said transmitter; and a transmitting section that: adds state information which identifies a state, in which said transmitter is adjusted by said adjustment section, to a signal; and transmits the signal to said receiver, and
said receiver includes:
a receiving section that obtains the state information from the signal transmitted from said transmitter; and
an identifying section that identifies a state of said transmitter based on the state information obtained by said receiving section.

2. The optical transmission system according to claim 1, wherein
said receiver reports that the state of said transmitter is in an adjustment stage when the state of said transmitter identified by said identifying section is in the adjustment stage.

3. The optical transmission system according to claim 1, wherein
said receiver shuts down the signal received from said transmitter when the state of said transmitter identified by the identifying section is in the adjustment stage.

4. The optical transmission system according to claim 3, wherein
said receiver releases the shutdown of the signal when the state of said transmitter identified by said identifying section is in an adjustment completion stage.

5. The optical transmission system according to claim 1, wherein
said transmitting section performs mapping of the state information to an optical transport network (OTN) frame and transmits the OTN frame to said receiver, and
said receiving section obtains the state information from the OTN frame.

6. A controlling method performed in a transmitter, the controlling method comprising:
an adjustment section performing adjustment of said transmitter;
a transmission section performing mapping of a state, in which said transmitter is adjusted by said adjustment section, to an optical transport network (OTN) frame as a state information of said transmitter; and
said transmission section transmitting the OTN frame to a receiver.

7. A controlling method performed in a receiver, the controlling method comprising
a receiving section receiving an optical transport network (OTN) frame to which mapping of state information that identifies a state of a transmitter is performed;
said receiving section obtaining the state information from the received OTN frame;
an identifying section identifying the state of said transmitter based on the obtained state information; and
a shut down circuit shutting down a signal received from said transmitter when the state of said transmitter identified by said identifying section is in an adjustment stage.

* * * * *